(12) United States Patent
Balinsky et al.

(10) Patent No.: US 8,015,369 B2
(45) Date of Patent: Sep. 6, 2011

(54) UPDATING DATA ENTRIES STORED ON A DATA STORAGE UNIT FROM AN AUTHORITY

(75) Inventors: Helen Balinsky, Cardiff Wales (GB); Thomas Rathbone, Wolverhampton (GB); Liqun Chen, Bristol (GB); Keith Harrison, Chepstow (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 837 days.

(21) Appl. No.: 12/019,237

(22) Filed: Jan. 24, 2008

(65) Prior Publication Data
US 2008/0183999 A1    Jul. 31, 2008

(30) Foreign Application Priority Data
Jan. 31, 2007   (GB) ................................ 0701778.3

(51) Int. Cl.
*G06F 13/00* (2006.01)
(52) U.S. Cl. ........................ 711/154; 711/163
(58) Field of Classification Search .................. 711/154, 711/163
See application file for complete search history.

(56) References Cited

U.S. PATENT DOCUMENTS

| | | | |
|---|---|---|---|
| 6,499,110 B1 * | 12/2002 | Moses et al. ...................... 726/1 |
| 7,110,976 B2 * | 9/2006 | Heimermann et al. .......... 705/37 |
| 7,779,482 B1 * | 8/2010 | Yen et al. ......................... 726/30 |
| 2005/0038753 A1 * | 2/2005 | Yen et al. ......................... 705/59 |
| 2005/0147250 A1 * | 7/2005 | Tang ............................ 380/259 |
| 2005/0216753 A1 | 9/2005 | Dailey et al. |
| 2005/0268341 A1 * | 12/2005 | Ross ............................... 726/26 |
| 2006/0173920 A1 * | 8/2006 | Adler et al. ................. 707/104.1 |
| 2008/0183999 A1 * | 7/2008 | Balinsky et al. ............... 711/163 |
| 2008/0216172 A1 * | 9/2008 | Forman et al. .................. 726/21 |

FOREIGN PATENT DOCUMENTS

| | | |
|---|---|---|
| GB | 2 204 970 A | 11/1988 |
| GB | 2 391 988 A | 2/2004 |
| WO | WO 03/021484 A2 | 3/2003 |
| WO | WO 03/021484 A3 | 3/2003 |

* cited by examiner

*Primary Examiner* — Reba I. Elmore (57) ABSTRACT

A method of updating a data entry stored on a data storage unit, the data entry including data elements that are unique to the data storage unit and the data entry, may begin with generating, at the data storage unit, an update request that includes the data entry for transmission to an authority authorized to update the data entry. The authority then extracts extracting at the authority the unique data elements from the update request and verifies the authenticity of the data storage unit and data entry from the unique data elements. The authority then generates an updated data entry including a further data element unique to the updated data entry and derived from the updated data. The authority then transmits the updated data entry to the data storage unit. The method may then include storing the updated data entry on the data storage unit.

20 Claims, 4 Drawing Sheets

UPDATING DATA ENTRIES STORED ON A DATA STORAGE UNIT FROM AN AUTHORITY

RELATED APPLICATIONS

The present application is based on, and claims priority from, United Kingdom Application Number 0701778.3, filed Jan. 30, 2007, the disclosure of which is hereby incorporated by reference herein in its entirety.

BACKGROUND TO THE INVENTION

It is increasingly common for more and more information to be stored electronically, rather than, as in the past, on physical records. It is also increasingly common for such information to be stored in a distributed fashion rather than at a single, or small number of, central locations. For example, information concerning individual items of equipment, such as service histories, are increasingly being maintained electronically by means of local memory devices physically attached to the equipment. An example of a suitable memory device for this application is the "Memory Spot" developed by the current applicant, which includes an electronic memory, a data processor and communication means integrated onto a single silicon chip. The local electronic memory can be updated whenever an action is performed on the piece of equipment, such as the replacement of a part or the completion of a routine maintenance action.

The use of local electronic memory is also increasingly common in applications where the stored data is preferably either maintained or verified by an issuing authority. For example, in the previous example the replacement of a part for a particular piece of equipment may be required to maintain the manufacturer warranty conditions and its replacement must therefore be verified in some manner by the authority providing the warranty, such as the manufacturer, so that they can be confident that the warranty conditions have been met by the equipment owner or user. Where such records were previously maintained centrally the act of updating the record itself could be performed by the issuing authority. However, where the information is stored electronically locally, an alternative method of either updating or verifying the information must be found. A further example of this requirement is the update of certain officially issued personal documents, such as a driving licence, identity card or passport. Previously where such documents were issued as physical documents any change of information, such as a change of the owner's address details or the addition or deletion of information such as driving licence endorsements, required the return of the physical document to the issuing authority for updates or and subsequent issue of a new, updated, physical document. As progress is made to replace such documents with electronic versions, such as smart cards, it is desirable for the information held on such electronic documents to be updated by the issuing authority without the physical return of the electronic document to that authority, yet for the data update to be performed to the satisfaction of the issuing authority.

Generally speaking, the increased use of locally stored data also increases the danger of that data quickly going out of date or loosing its synchronisation with a corresponding data record held by a relevant authority.

SUMMARY OF THE INVENTION

According to a first aspect of the present invention there is provided a method of updating a data entry stored on a data storage unit, the data entry including data elements that are unique to the data storage unit and the data entry, the method comprising the steps of: generating at the data storage unit an update request including the data entry for transmission to an authority authorised to update the data entry;

extracting at the authority the unique data elements from the update request and verifying the authenticity of the data storage unit and data entry from the unique data elements;

generating an updated data entry including a further data element unique to the updated data entry and derived from the updated data and transmitting the updated data entry to the data storage unit;

and storing the updated data entry on the data storage unit.

The method may further comprise extracting at the data storage unit the further data element that is unique to the updated data entry and verifying the authenticity of the updated data entry.

Additionally, the step of storing the updated data entry on the data storage unit may only occur if the authenticity of the updated data entry is verified.

The method may further comprise the step of generating at the data storage unit a transaction ID in response to receiving the updated data entry for transmission to the authority.

Furthermore, the data entry may include a data portion and a hash value, the hash value being the product of performing a hashing operation on the data portion and a first secret data item unique to the data storage unit. Additionally the step of verifying the authenticity of the data storage unit and data entry may include extracting the data portion, performing a further hashing operation on the data portion and the first secret value and comparing the resultant hash value with the hash value included in the data entry. Additionally, the data entry may further include an encrypted portion that includes the first secret value and the step of extracting the unique data elements includes decrypting the encrypted portion and reading the first secret value.

The updated data entry may also include an updated data portion and a second hash value, the second hash value being the product of a hashing operation performed on the updated data portion and the first secret value. Additionally, the step of verifying the updated data entry by the data storage unit comprises performing the hashing operation on the update data portion and comparing the resultant value with the second hash value included in the updated data entry.

Additionally or alternatively, the transaction ID is may be generated by performing a hashing operation on an updated data portion of the updated data entry and a second secret value unique to the data storage unit.

The step of storing the updated data entry may include storing the updated data entry in a first data storage location, the first data storage location being denoted as an invalid location, verifying the authenticity of the updated data entry and denoting the first data storage location as valid and denoting a second data storage location in which the corresponding original data entry is located as invalid.

DESCRIPTION OF EMBODIMENTS OF THE INVENTION

Figure 1:
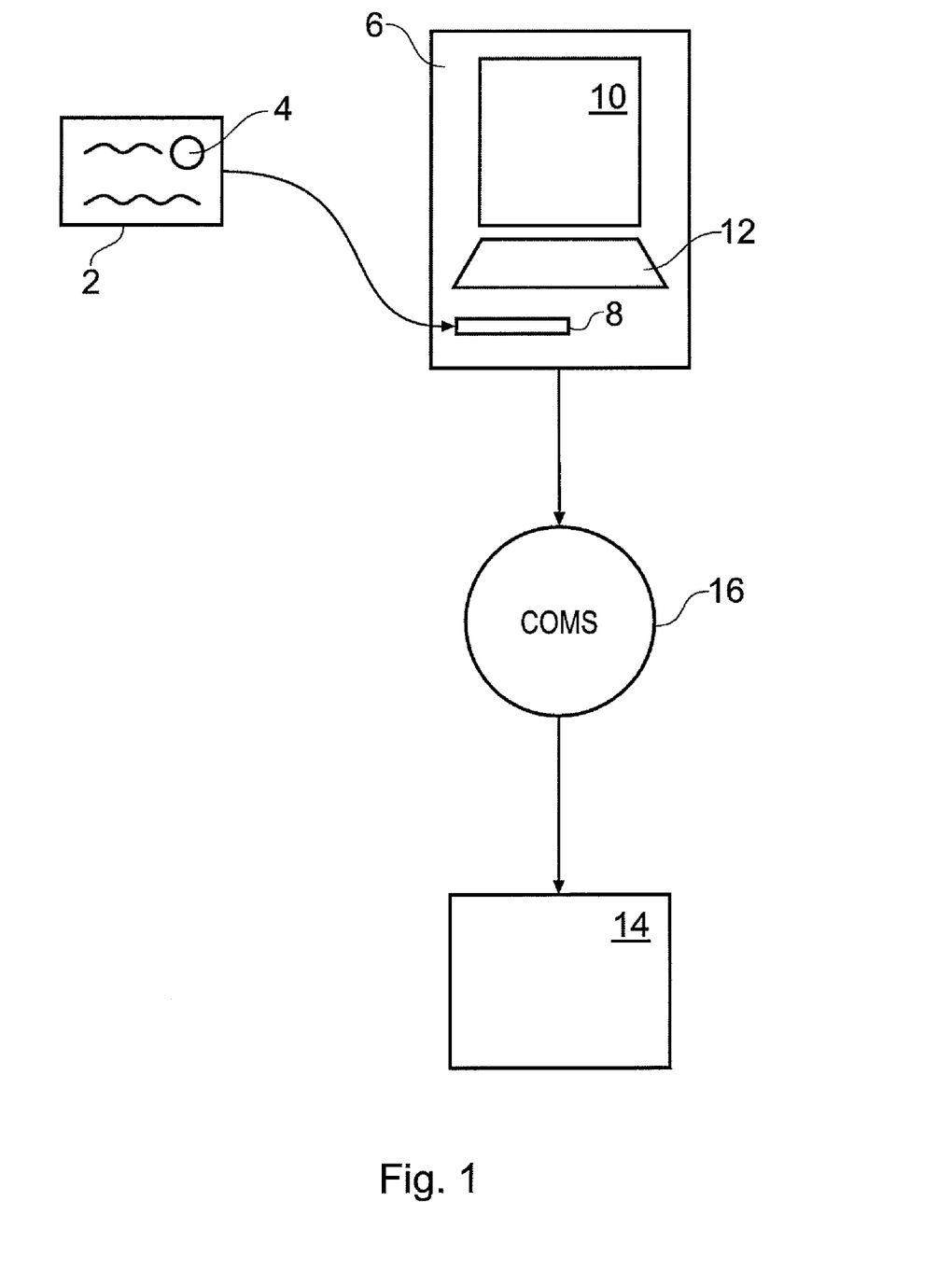
FIG. 1 schematically illustrates a physical system in which the method of embodiments of the present invention can be used.

FIG. 1 schematically illustrates the physical elements of a system to which the method of embodiments of the present invention may be applied. An electronic smartcard 2, such as an electronic driving licence or passport, is provided that includes a data storage module 4. In preferred embodiments the data storage module 4 may comprise a memory tag, such as those produced under the trade name of "Memory Spot" by the current applicant. The data storage module preferably includes a data processor, memory and a data interface (not illustrated). A document reader 6 is provided that includes a communications interface 8 that is arranged to be capable of communication with the data storage unit 4 on the smartcard 2. For example, the communication interface 8 may comprise a slot into which the smartcard is inserted, the slot including a suitable data connector for communicating data to and from the data storage unit 4 on the smartcard 2. Where the data storage module 4 is embodied using a memory tag, the communication between the data storage unit 4 and the document reader 6 may be accomplished wirelessly. The data reader 6 may include a visual display 10 and a data input unit, such as a keyboard 12 to facilitate its operation by a user. The document reader 6 is preferably connected to the issuing authority 14 that is responsible for the maintenance and updating of the user's information stored on the smartcard 2, the communication taking place via any suitable communication network 16, such as a local or wide area network, a telecommunications network or other network facility, such as the internet. It is envisaged that the document reader 6 will be located remotely from the issuing authority site so as to facilitate the update of the desired information by the smartcard owner at a location convenient to that user. For example, the data card reader may be located at existing retail outlets or public buildings, such as libraries, or may be located at dedicated remote locations maintained by the issuing authority 14. Further the reader may be included in a personal mobile device, such as a mobile phone, PDA or laptop computer.

Figure 2:
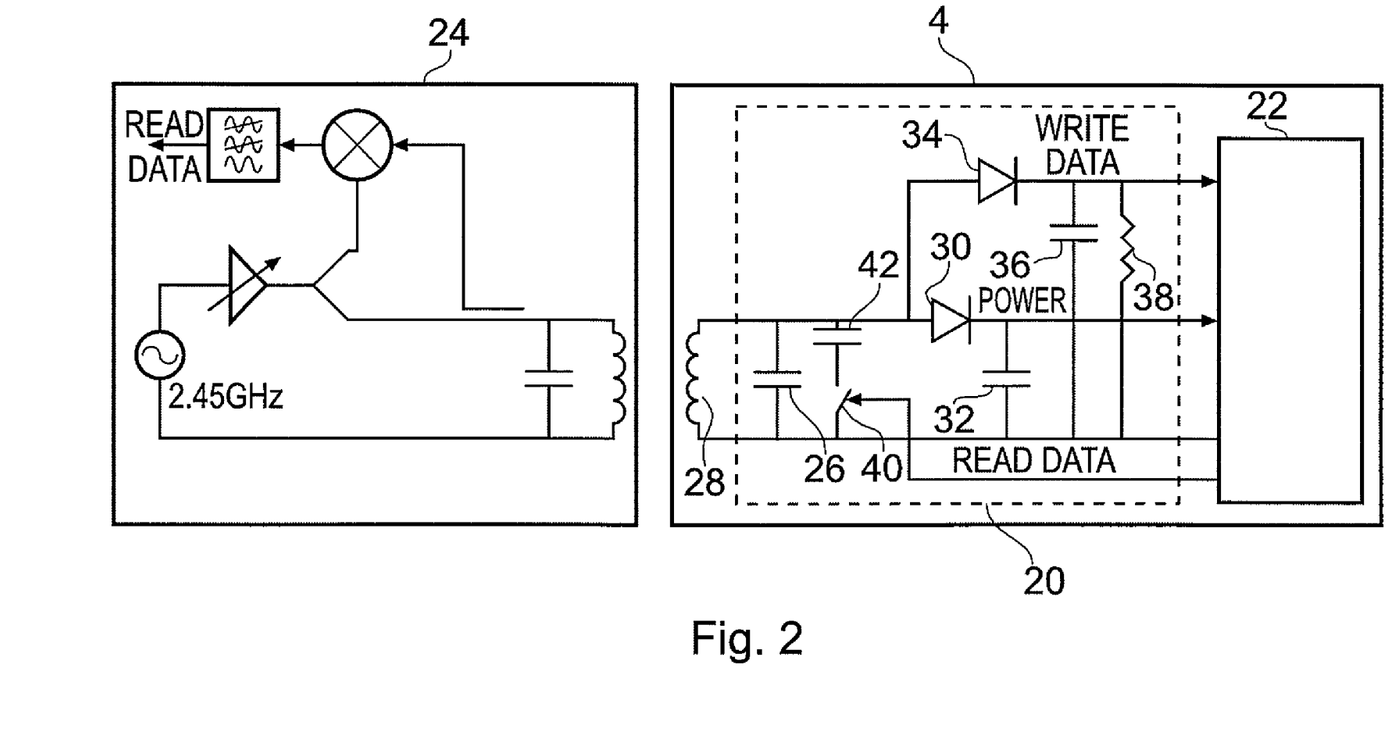
FIG. 2 schematically illustrates an implementation of a memory tag and tag reader used in embodiments of the present invention.

An example of a suitable implementation for a wireless memory tag to be used in the electronic document 2 and memory tag reader for use within the document reader 6 is schematically illustrated in FIG. 2. The memory tag 4 includes an interface circuit 20 and a memory module 22 that are connected to one another via a data bus. The memory tag interface 20 comprises an RF transponder circuit including a first capacitor 26 which, in combination with an antenna coil 28, forms a resonant circuit with component values being chosen to tune the combination to a frequency of approximately 2.45 GHz (for example) for inductive coupling with the memory tag reader 24. The portion of the transponder circuit responsible for power supply is diode 30 and second capacitor 32, with the diode 30 rectifying the alternating current generated by the inductive coupling and the second capacitor 32 acting as a power supply storage. The portion of the memory tag interface responsible for the reception and transmission of data from and to the tag reader is further diode 34, third capacitor 36 and a resistor 38, which together form a simple envelope detector. Data thus received by the memory tag is stored in the memory 22, the portion of the interface 20 of the memory tag responsible for reading data back from the memory 22 is formed by the tuned circuit 28/26 in combination with a first switch 40 and fourth capacitor 42. Switching the fourth capacitor 42 in and out of the circuit using the first switch 40 changes the resonance of the tuned circuit resulting in phase modulation of the reflected power directed from the memory tag to the tag reader.

Figure 3:
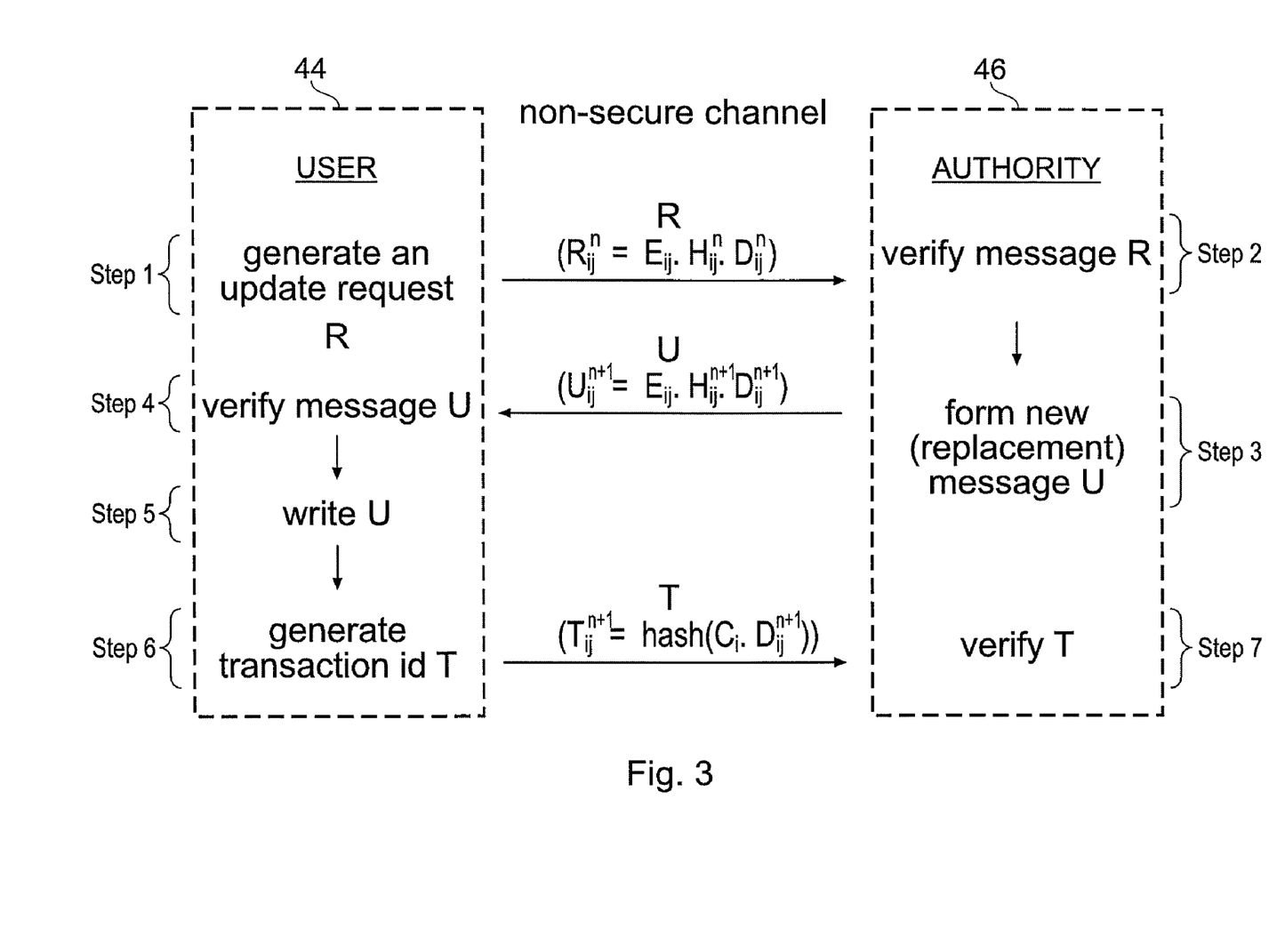
FIG. 3 schematically illustrates the communication protocol according to an embodiment of the present invention.

FIG. 3 schematically illustrates the communications protocol between an owner (user) 44 of an electronic document and the issuing authority 46 responsible for maintaining and verifying the data stored on the electronic document. When a user has a requirement to update an item of data stored on the electronic document the electronic document generates (step 1) an update request R that is submitted over a non-secure channel to the issuing authority where the update request R is subsequently verified (step 2). The verification process verifies that the data received from the electronic document is as expected and has not been tampered with. Once the authority has verified the authenticity of the user's electronic document and the data contained therein, the authority generates a new, replacement, message U (step 3) that includes the updated form of the requested data and the replacement message U (step 4) is transmitted back to the user. The electronic document then verifies the new message U and on successful verification writes the new data to the onboard memory (step 5). In preferred embodiments the user's electronic document also generates (step 6) a transaction ID T after successfully writing the updated information and transmits the transaction ID T back to the issuing authority, which subsequently verifies the transaction ID (step 7). The details of this communication protocol will be described in more detail below.

Figure 4:
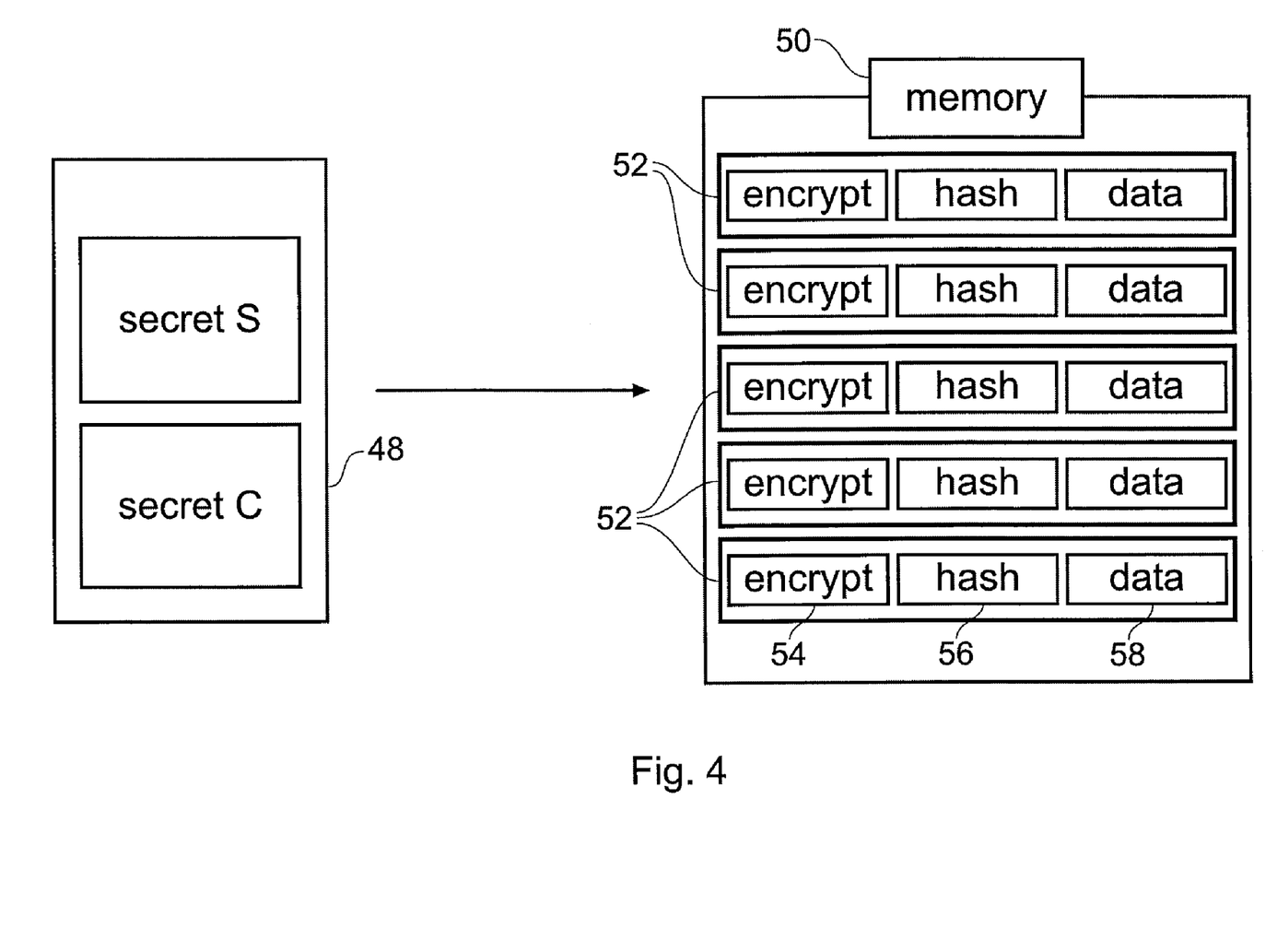
FIG. 4 schematically illustrates the structure and content of part of the memory of a data storage unit according to an embodiment of the present invention.

FIG. 4 schematically illustrates the data content and data structure of the data storage unit 4 used in embodiments of the present invention. Two items of secret data, first secret S and second secret C are stored in a portion 48 of internal memory that is arranged such that only the data storage unit can access and read these secrets. A second portion 50 of memory within the data storage unit is allocated for the storage of the data items that are either issued or verified by the authority. This portion of memory is divided into discrete sections 52 of memory. These sections comprise the document contents and are readable by anyone who is accessing the document. However, it is only possible to replace any section allowed for updates by the authentic data issued by the authority. Each data storage unit has j sections 52 of memory.

Each data entry held within a particular section of memory includes three elements, 10 labelled "encrypt" 54, "hash" 56 and "data" 58 in FIG. 4. The data element includes the data storage unit ID i (each data storage unit has an unique ID), the index of the section of memory j, a revision counter n and the actual data item stored in the section of the data storage unit, for example a product code or service description or date of birth or address. For any given entry the data element 58 can be represented as $D_{ij}^n$=(i.j.n. data item).

The encrypted element 54 is formed by running an encryption algorithm on the first and second secrets $S_i$ $C_i$, the data storage ID i, the memory section index j, any optional flags f that may hold extra information for possible automatic checks, such as the last revision number, and a random data stream g unique to the data storage unit. The encrypted element 54 may thus be represented as $E_{ij}$=encrypt$_k$ (Si.Ci.ij.f.g.hash($D_{ij}^n$)) where k is the encryption key. The encryption occurs at the issuing authority only and the algorithm is only known to the authority, with the initial encryption process occurring when the very first data item is stored on the data storage unit of the smartcard at its time of creation or issue to the user. The hash element 56 is formed by combining (preferably concatenating) the first secret $S_i$ and the data element $D_{ij}^n$ and performing a predefined hashing algorithm and can be represented as $H_{ij}^n$=hash ($S_i$, $D_{ij}^n$). First and second secrets $S_i$ and $C_i$ are preferably at least 80 bits in length. They may also be derived from a single secret seed. For example $S_i$=hash (seed||0) and $C_i$=hash (seed||1), or alternatively $S_i$=seed and $C_i$=hash (seed).

When a user either wishes or is required to update the stored data, an update request R is generated and transmitted to the authority, the update request R including the encrypt element $E_{ij}$, the data element $D_{ij}^n$ and the corresponding hash $H_{ij}^n$. Any given update request may thus be represented as $R_{ij}^n = E_{ij}^n \cdot H_{ij}^n \cdot D_{ij}^n$. On receipt of the update request the authority extracts the encrypt element $E_{ij}$ and decrypts it using the encryption key $K_n$ to obtain the unique data stream g, the first and second secrets $S_i$ $C_i$, the memory section index j and any included flags f. The data stream g and the flags f are verified by the authority, since these were set and are known by the authority for the identified data storage. If this verification process is not successfully completed the update procedure is halted and notification of possible data corruption or tampering is generated. On the provision of the successful verification of the data stream g and flags f, the data element $D_{ij}^n$ is also extracted from the update request R and is concatenated with the previously extracted first secret $S_i$ and a hash subsequently computed on the combined data $D_{ij}^n$ and secret $S_i$, this hash being denoted h (h=hash($S_i \cdot D_{ij}^n$)). The extracted hash $H_{ij}^n$ included with the update request R is then compared with the calculated hash h. For valid data transmitted from an authorised data storage unit the two hashes should match. If they do not match the update process is halted and an alert message is preferably generated.

Having fully verified the received update request R from the data storage unit, a new, replacement, message U including the requested updated data is generated by the authority. The replacement message U includes a new data element $D_{ij}^{n+1}$ with the counter value n from the update request having been extracted and incremented by one. In an analogous manner to $D_{ij}^n$, the new data element $D_{ij}^{n+1}$ may be represented as $D_{ij}^{n+1}=(i.j.n+1.\text{data\_item}^1)$ where data_item$^1$ represents the updated version of the actual data. The updated data element $D_{ij}^{n+1}$ is concatenated with the first data storage unit secret $S_i$ and a new hash value $H_{ij}^{n+1}=\text{hash}(S_i \cdot D_{ij}^{n+1})$ is computed. The complete replacement message U thus contains updated data element $D_{ij}^{n+1}$, new hash value $H_{ij}^{n+1}$ and the encrypt element $E_{ij}$, which was extracted from the update request R received from the data storage unit. The replacement message is thus communicated back to the data storage unit to be written to the allocated memory section j.

In the above example it is assumed that each data entry on a single data storage card uses the same secrets $S_i$ and $C_i$. This may well be the case where all the individual data items are managed by a single issuing authority. However, other embodiments of the present invention allow different secrets $S_i$ and $C_i$ to be used for individual data entries stored on a single data storage card. This allows data to be managed by multiple authorities whilst still restricting the management of individual data items to individual authorities.

In preferred embodiments the replacement message U received from the authority is first verified by the data storage unit before it is written to the specified memory section. The verification procedure involves reading the data element $D_{ij}^{n+1}$ part of the replacement message U, combining it with the stored first secret $S_i$ and computing its hash. If the result of this hash computation matches the transmitted hash value $H_{ij}^{n+1}$ then it is certain that the transmission must have come from the authorised authority, has not been tampered with and is generated specifically for the particular data storage. The value of the memory section j is read from the data element $D_{ij}^{n+1}$ to identify the memory section being updated. Furthermore, a check is made to verify that the counter value n+1 contained in data element $D_{ij}^{n+1}$ has been incremented by one from the counter in the corresponding stored data element $D_{ij}^n$ (from the specified memory section j). If it is not, then the update process on the data storage unit is halted due to a possible replay attack. Provided the counter has been incremented by only one then the replacement message U is written to the specified memory section j.

In some embodiments of the present invention a temporary update buffer is provided on the data storage unit for use during the update procedure. The temporary buffer is provided to prevent the entering of non-authorised data, either by malicious action, user error or tampered real data due to accidental or intentional power removal before the completion of the replacement message verification process. The buffer function is achieved by writing the replacement message U received from the authority in an unused memory section. If the data is accepted as valid after the various actions of the verification process the index assigned to the spare memory section to which the replacement message U has been written is replaced with the specified memory section contained within the replacement message U, whilst the original memory section index where the data was previously stored is changed to the index of the spare section. In other words, during the verification process there are two entries for the data within the memory, a valid, or original, one and a corresponding invalid entry. The last operation that completes the transaction is to swap the valid and invalid entries. Interruption of the transaction at any moment before the final swap occurs results in the original data being unchanged.

In some embodiments of the present invention it is required for the data storage unit to generate a transaction ID on completion of writing the replacement message U to memory. The transaction ID is generated by concatenating the replacement data element $D_{ij}^{n+1}$ and the second data storage unit secret $C_i$ and computing its hash $H_T$. This is then transmitted as the transaction ID to the authority on receipt of the transaction IDT the authority compares the transmitted hash $H_T$ with a corresponding hash value of the updated data element $D_{ij}^{n+1}$ and the second secret $C_i$, the second secret being extracted from the original update request R. If both hash values are equal the transaction ID is accepted and the transaction is considered complete. Failure to provide a valid transaction ID may result in different administrative measures, for example such as the termination of an equipment warranty.

In the above exemplary embodiment the operator "." represents concatenation. However other operators or methods of combining the individual elements may be used, such as other equations or data interleaving.

Advantages of this methodology are that the information update can be performed at any location by any non-trusted individual with access to a data storage unit reader. For example appropriate document readers may be located at dedicated kiosks, post offices or other retail units and may also be integrated within handheld mobile devices such as mobile phones or PDAs. Impersonation or cloning of individual data storage units is inhibited due to the use of the authentication procedure in which the validity of the data held on the data storage unit is verified by the issuing authority, using the protected first and second secrets known only to the issuing authority. The replaying of an update request or new message in an attempt to rewrite existing data is not possible due to the inclusion of a data revision/version index that must always be higher than the current revision index for a new message to be accepted. Consequently, the methodology provides a very secure method of allowing non-trusted individuals or parties to update sensitive information.

The invention claimed is:

1. A method of updating a data entry stored on a data storage unit, the data entry including data elements that are unique to the data storage unit and the data entry, the method comprising the steps of:
   generating at the data storage unit an update request including the data entry for transmission to an authority authorised to update the data entry;
   extracting at the authority the unique data elements from the update request and verifying the authenticity of the data storage unit and data entry from the unique data elements;
   generating an updated data entry including a further data element unique to the updated data entry and derived from the updated data and transmitting the updated data entry to the data storage unit; and
   storing the updated data entry on the data storage unit.

2. The method of claim 1, wherein the data entry includes a data portion and a hash value, the hash value being the product of performing a hashing operation on the data portion and a first secret data item unique to the data storage unit.

3. The method of claim 1, wherein the step of storing the updated data entry includes:
   storing the updated data entry in a first data storage location, the first data storage location being denoted as an invalid location;
   verifying the authenticity of the updated data entry; and
   denoting the first data storage location as valid and denoting a second data storage location in which the corresponding original data entry is located as invalid.

4. The method of claim 1 further comprising extracting at the data storage unit the further data element that is unique to the updated data entry and verifying the authenticity of the updated data entry.

5. The method of claim 4, wherein the step of storing the updated data entry on the data storage unit only occurs if the authenticity of the updated data entry is verified.

6. The method of claim 1 further comprising the step of generating at the data storage unit a transaction ID in response to receiving the updated data entry and transmitting the transaction ID to the authority.

7. The method of claim 6, wherein the transaction ID is generated by performing a hashing operation on an updated data portion of the updated data entry and a second secret value unique to the data storage unit.

8. A method of updating a data entry stored on a data storage unit, the data entry including data elements that are unique to the data storage unit and the data entry, the method comprising at an authority authorized to update the data entry:
   receiving an update request including the data entry;
   extracting the unique data elements from the update request and verifying the authenticity of the data storage unit and data entry from the unique data elements; and
   generating an updated data entry including a further data element unique to the updated data entry and derived from the updated data and transmitting the updated data entry to the data storage unit for storage on the data storage unit; and
   wherein the data entry includes a data portion and a hash value, the hash value being a product of performing a hashing operation on the data portion and a first secret data item unique to the data storage unit;
   wherein the step of verifying the authenticity of the data storage unit and data entry include extracting the data portion, performing a further hashing operation on the data portion and the first secret data item and comparing a resultant hash value with the hash value included in the data entry.

9. The method of claim 8, wherein the data entry further includes an encrypted portion that includes the first secret value and the step of extracting the unique data elements includes decrypting the encrypted portion and reading the first secret value.

10. The method of claim 9, wherein the update data entry includes an updated data portion and a second hash value, the second hash value being the result of a hashing operation performed on the updated data portion and the first secret value.

11. The method of claim 10, wherein the step of verifying the updated data entry by the data storage unit comprises combining the updated data portion with the first secret value and performing the hashing operation and comparing the resultant value with the second hash value included in the updated data entry.

12. A method of updating a data entry stored on a data storage unit, the data entry including data elements that are unique to the data storage unit and the data entry, the method comprising the steps of:
   generating, at the data storage unit an update request including the data entry, an ecrypt element and a corresponding hash for transmission to an authority authorised to update the data entry;
   receiving a replacement message from the authority and extracting, from the replacement message, at the data storage unit, an updated data entry, the encrypt element and a second hash and verifying the authenticity of the updated data entry; and
   storing the updated data entry on the data storage unit only if the authenticity of the update data entry is verified.

13. The method of claim 12, wherein the encrypt element comprises a secret data item stored at said data storage unit and a data storage identification corresponding to a location in the data storage unit of the data entry, said secret data item and data storage identification being combined and encrypted with an encryption algorithm to produce said encrypt element.

14. The method of claim 12, wherein each data entry in the data storage unit is associated with an encrypt element, the encrypt element in the update request being the encrypt element associated with the data entry to be updated that is also included in the update request.

15. The method of claim 12, wherein the corresponding hash is obtained by performing a hashing algorithm on a combination of the data entry and a secret data item stored at said data storage unit.

16. The method of claim 12, further comprising:
   generating a secure transaction identification when the updated data entry is stored in the data storage unit; and
   transmitting the secure transaction identification to the authority to confirm that the updated data entry has been stored in the data storage unit.

17. The method of claim 16, wherein generating said secure transaction identification comprises computing a hash value from the updated data entry plus a secret data item stored at said data storage unit.

18. A method of updating a data entry stored on a data storage unit, said updating being performed under the direction of an authority, the method comprising:
   at the authority, receiving, from the data storage unit, an update request including the data entry, an ecrypt element and a corresponding hash;

extracting data elements from the update request for verifying the authenticity of the data storage unit and data entry;

generating an updated data entry including a further data element unique to the updated data entry;

transmitting a replacement message from the authority to the data storage unit, the replacement message comprising the updated data entry, the encrypt element and a second hash.

19. The method of claim 18, receiving, from the data storage unit, a secure transaction identification indicating that the updated data entry has been stored at the data storage unit, the transaction identification comprising a hash value computed from the updated data entry plus a secret data item stored at said data storage unit.

20. The method of claim 18, wherein the encrypt element comprises a secret data item stored at said data storage unit and a data storage identification corresponding to a location in the data storage unit of the data entry, said secret data item and data storage identification being combined and encrypted with an encryption algorithm to produced said encrypt element.

* * * * *

UNITED STATES PATENT AND TRADEMARK OFFICE
CERTIFICATE OF CORRECTION

PATENT NO. : 8,015,369 B2  
APPLICATION NO. : 12/019237  
DATED : September 6, 2011  
INVENTOR(S) : Helen Balinsky et al.

Page 1 of 1

It is certified that error appears in the above-identified patent and that said Letters Patent is hereby corrected as shown below:

In column 8, line 10, in Claim 10, delete "update" and insert -- updated --, therefor.

In column 8, line 26, in Claim 12, delete "ecrypt" and insert -- encrypt --, therefor.

In column 8, line 35, in Claim 12, delete "update" and insert -- updated --, therefor.

In column 8, line 66, in Claim 18, delete "ecrypt" and insert -- encrypt --, therefor.

Signed and Sealed this  
Twenty-seventh Day of March, 2012

David J. Kappos  
*Director of the United States Patent and Trademark Office*